(12) United States Patent
Harada et al.

(10) Patent No.: US 7,950,292 B2
(45) Date of Patent: May 31, 2011

(54) CAPACITIVE ELECTROMAGNETIC FLOWMETER

(75) Inventors: Yutaka Harada, Tokyo (JP); Ichiro Mitsutake, Tokyo (JP); Kouji Okuda, Tokyo (JP); Taka Inoue, Tokyo (JP); Tetsuya Kajita, Tokyo (JP)

(73) Assignee: Yamatake Corp., Tokyo (JP)

( * ) Notice: Subject to any disclaimer, the term of this patent is extended or adjusted under 35 U.S.C. 154(b) by 136 days.

(21) Appl. No.: 12/447,690

(22) PCT Filed: Aug. 3, 2007

(86) PCT No.: PCT/JP2007/065262
§ 371 (c)(1),
(2), (4) Date: Apr. 29, 2009

(87) PCT Pub. No.: WO2008/053624
PCT Pub. Date: May 8, 2008

(65) Prior Publication Data
US 2010/0071476 A1  Mar. 25, 2010

(30) Foreign Application Priority Data
Oct. 31, 2006 (JP) .................. 2006-295744

(51) Int. Cl.
*G01F 1/58* (2006.01)
*G01R 27/26* (2006.01)
(52) U.S. Cl. .................... 73/861.12; 324/658; 702/45

(58) Field of Classification Search .................. None
See application file for complete search history.

(56) References Cited

U.S. PATENT DOCUMENTS
2007/0283766 A1  12/2007  Ishikawa ............. 73/861.11
2010/0060298 A1  3/2010  Harada et al. ........... 324/658

FOREIGN PATENT DOCUMENTS
JP   05-069631 U   9/1993
JP   05-231890 A   9/1993
JP   06-241856 A   9/1994

OTHER PUBLICATIONS

"Selected Analog Circuits", p. 30; Tamotsu Inaba; CQ Publishers; Jan. 10, 1989 (translation of page into English appended).

*Primary Examiner* — Harshad Patel
(74) *Attorney, Agent, or Firm* — McDermott Will & Emery LLP

(57) ABSTRACT

In a constant current circuit, a constant current is caused to flow through a resistor, thereby causing a constant voltage to occur across the resistor. This constant voltage is then superimposed on an output signal of an operational amplifier that is to be fed back to the drain of a field effect transistor, thereby maintaining the same potential in an AC manner between the output terminal of the operational amplifier and the drain of the field effect transistor. In this way, the gate and drain of the field effect transistor is caused to exhibit the same potential in an AC manner, so that no current will occur through the stray capacitance between the gate and drain of the field effect transistor. As a result, similarly to a case of using a feedback capacitor, the input impedance of the field effect transistor can be raised.

2 Claims, 9 Drawing Sheets

CAPACITIVE ELECTROMAGNETIC FLOWMETER

CROSS REFERENCE TO RELATED APPLICATION

This is a U.S. national phase application under U.S.C. §371 of International Patent Application No. PCT/2007/065262, filed Aug. 3, 2007 and claims the benefit of Japanese Patent Application No. 2006-295744, filed Oct. 31, 2006. The International Application was published in Japanese on May 8, 2008 as International Publication No. WO/2008/053624 under PCT Article 21(2) the contents of which are incorporated herein in their entirety.

FIELD OF TECHNOLOGY

The present invention relates to a capacitive electromagnetic flowmeter provided with a signal electrode for electrostatic capacitive coupling with a fluid that flows within a measuring tube.

BACKGROUND OF THE INVENTION

Conventionally, this type of capacitive electromagnetic flowmeter has an excitation coil for producing a magnetic field in a direction that is perpendicular to the direction of flow of the fluid that flows within the measuring tube, and a signal electrode for electrostatic capacitance coupling with a fluid that flows within the measuring tube, provided within the measuring tube, to pick up, through the signal electrode, the electromotive force that is generated in the fluid that flows within the measuring tube due to the magnetic field that is created by the excitation coil. Note that normally a guard electrode for shielding the signal electrode is provided for the signal electrode, and a pair of signal electrodes and the guide electrodes is provided in a direction that is perpendicular to the magnetic field that is produced by the excitation coil.

In this type of capacitive electromagnetic flowmeter, the impedance of an insulating portion between a signal electrode and the fluid (the electrostatic capacitive coupling portion) is high, in the order of several dozen to several hundred MΩ. A circuit with high input impedance (a signal acquiring circuit) is necessary to order to pick up the signal (the electromotive force) with high accuracy from the high impedance electrostatic capacitive coupling portion. For example, in order to have the attenuation of the signal be 0.1% at electric static capacitive coupling portion, it is necessary for the input impedance of the signal pickup circuit to be 1000 times the impedance of the electrostatic capacitive coupling portion. A signal pickup circuit such as been proposed in Japanese Unexamined Patent Application Publication H6-241856 as a circuit that fulfills this requirement is illustrated in FIG. 9.

In FIG. 9, Vd is the alternating current electromotive force that is generated in the fluid being measured; Cd is the electrostatic capacitance that is formed between the fluid being measured and a signal electrode 4; Q1 is a field effect transistor; and OP1 is an operational amplifier. The gate G of the field effect transistor Q1 is connected to the signal electrode 4; the source S is connected to the non-inverting input terminal (+) of the operational amplifier OP1; and the drain D is connected to the power supply VDD (the high voltage point) through a resistor R3.

A series circuit of a resistor R1 and a resistor R2 is connected between a common voltage point COM and the gate G of the field effect transistor Q1, and the contact point between the resistor R1 and the resistor R2 is connected through a capacitor C1 to the inverting input terminal (−) of the operational amplifier OP1. A bootstrap circuit is structured from these resistors R1 and R2 and the capacitor C1.

The power supply VSS (low voltage point: VSS<VDD) is connected through a resistor R4 to the source S of the field effect transistor Q1, and the output terminal of the operational amplifier OP1 is not only connected to the drain D of the field effect transistor Q1 through a capacitor C2, and also connected to the inverting input terminal (−) of the operational amplifier OP1 and the capacitor C1.

In the signal pickup circuit 100, the alternating current electromotive force Vd that is produced in the fluid that is being measured passes through the electrostatic capacitance Cd to be applied to the gate G of the field effect transistor Q1. In this case, the field effect transistor Q1 functions as a source follower, and so the signal that is applied to the gate G appears as a signal with the same voltage at the source S of the field effect transistor Q1. This signal is applied to the non-inverting input terminal (+) of the operational amplifier OP1.

The operational amplifier OP1 functions as a buffer with an amplification of essentially "1," and outputs a signal of the same voltage as the signal that is applied to the non-inverting input terminal (+). The output terminal of the operational amplifier OP1 is connected to the inverting input terminal (−), so the non-inverting input terminal (+) and the inverting input terminal (−) of the operational amplifier OP1 will be at the same voltage, so that the output terminal of the operational amplifier OP1 and the gate G of the field effect transistor Q1 will also be at the same voltage.

On the other hand, because the capacitor C2 is connected between the output terminal of the operational amplifier OP1 and the drain D of the field effect transistor Q1, the same voltage is maintained between the two in terms of alternating current. Consequently, the voltages of the gate G and the drain D of the field effect transistor Q1 will be identical in terms of alternating current, so that there will be no electric current through the floating capacitance between the two.

The field effect transistor Q1 functions as a source follower, so the voltages between the gate G and the source S will be identical in terms of alternating current, and so there will be no current through the floating capacitance between these two either.

The result is that there will be no drop in impedance caused by the floating capacitance in the field effect transistor Q1, making it possible to increase the input impedance of the field effect transistor Q1. Additionally, the point of contact between the resistors R1 and R2 will be essentially the same voltage as the gate G, so that there will be no electric current through the resistor R1. Consequently, the input impedance of the signal pickup circuit 100 will be infinitely large, making it possible to pick up, with high accuracy, the electromotive source Vd that is produced in the fluid being measured.

Note that the publication by Tamotsu INABA, "Selected Analog Circuits," Page 30, CQ Publishers, 10 Jan. 1989 can be proposed as a detector circuit for a signal wherein the signal source impedance is high. This reference describes how it is possible to achieve a high input impedance through combining a field effect transistor and a bootstrap circuit in the input portion, and also to use a capacitor to apply a positive feedback. The structure described in this reference suggests a structure wherein a capacitor C2 (hereinafter termed the "feedback capacitor") is connected between the output terminal of the operational amplifier OP1 and the drain D of the field effect transistor Q1 in the signal pickup circuit 100, as described above.

However, given the conventional signal pickup circuit 100 illustrated in FIG. 9, there is the possibility that an electric charge will accumulate in the large capacitance of the feedback capacitor C2 between the output terminal of the operational amplifier OP1 and the drain D of the field effect transistor Q1. Because of this, it is necessary to use a large capacitance capacitor, which is physically large, as the feedback capacitor C2, with not only a problem that the electric circuit will take too much space, but also that it is necessary to house the circuit in a strictly explosion-proof container.

The object of the present invention is to provide a capacitive electromagnetic flowmeter wherein it is possible to increase the input impedance of the signal pickup circuit while eliminating the feedback capacitor to reduce the size of the circuit, while also eliminating the need for the explosion-proof enclosure.

SUMMARY OF THE INVENTION

In order to achieve this object, capacitive electromagnetic flowmeter includes an excitation coil for producing a magnetic field in a direction that is perpendicular to the direction of flow of a fluid that flows within a measuring tube; a signal electrode, provided within the measuring tube, for picking up an electromotive force that is produced in the fluid that flows within the measuring tube due to the magnetic field that is produced by the excitation coil, through electrostatic capacitive coupling with the fluid that flows within the measuring tube; a first field effect transistor that has a gate input of the electromotive force that is picked up by the signal electrode; an operational amplifier wherein the output of the source of the first field effect transistor is applied to the non-inverting input terminal thereof; a first and a second feedback path to feedback, to the inverting input terminal of the operational amplifier and to the drain of the first field effect transistor, the output signal from the output terminal of the operational amplifier; a voltage maintaining circuit for maintaining the voltages of the gate and the drain of the first field effect transistor at the same voltage, in terms of alternating current through superimposing a predetermined constant voltage, generated by a flow of an electric current, onto the output signal of the operational amplifier that is fed back to the drain of the first field effect transistor; a series connection circuit of a first and a second resistor, connected between the gate of the first field effect transistor and a common voltage point; and a capacitor that is connected between the contact point of the first and second resistors and the inverting input terminal of the operational amplifier.

Given the present invention, the voltages of the gate and the drain of the first field effect transistor are maintained at the same voltage, in terms of alternating current, by superimposing a predetermined fixed voltage that is generated by the flow of the electric current onto the output signal from the operational amplifier that is fed back to the drain of the first field effect transistor, enabling the feedback capacitor between the output terminal of the operational amplifier and the drain of the first field effect transistor to be eliminated, making it possible to eliminate the need for containment in an explosion-proof container, and enabling the input impedance of the signal pickup circuit to be increased, in a circuit with a small surface area.

DETAILED DESCRIPTION OF THE INVENTION

The present invention will be described in detail below based on the drawings. A capacitive electromagnetic flowmeter according to an embodiment according to the present invention will be described using FIG. 1, FIG. 8A, and FIG. 8B.

Figure 1:
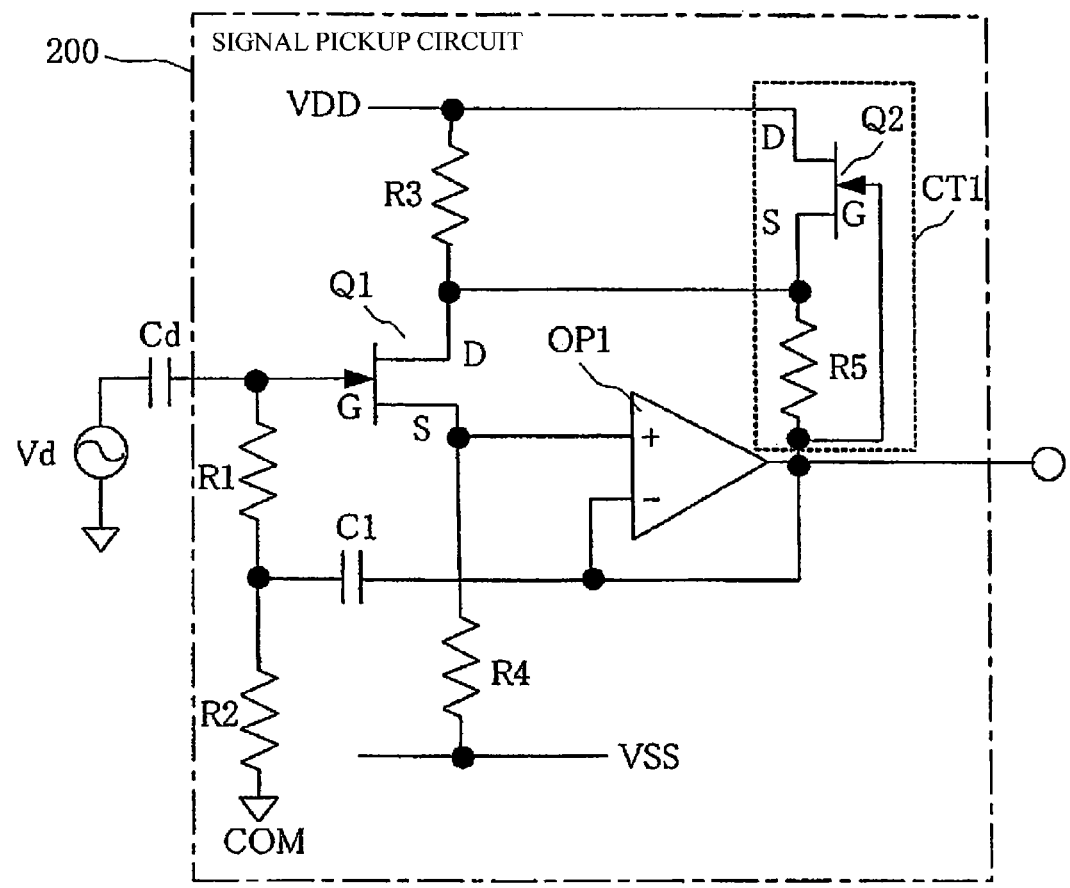
FIG. 1 is a circuit diagram of a signal pickup circuit for a capacitive electromagnetic flowmeter according to an embodiment according to the present invention.
Figure 8A:
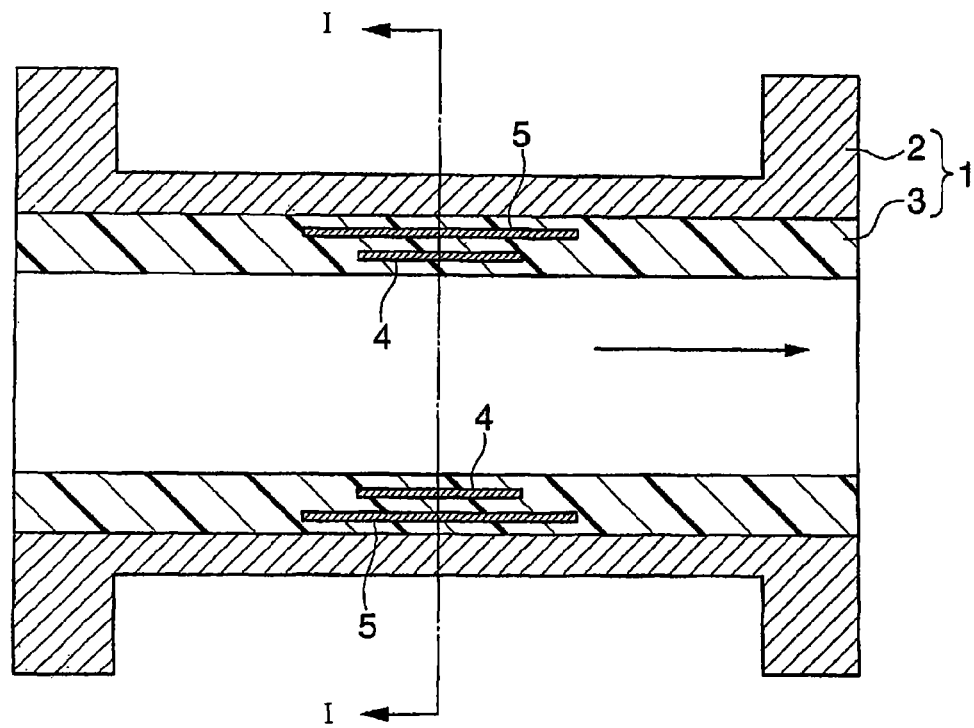
FIG. 8A is a longitudinal sectional diagram of a capacitive electromagnetic flowmeter according to the present invention.
Figure 8B:
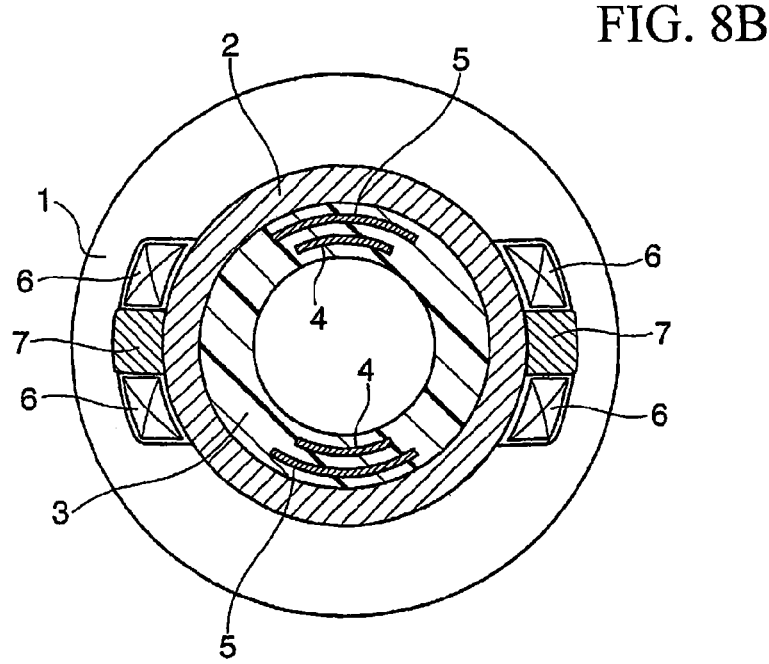
FIG. 8B is a cross-sectional diagram along the section I-I in FIG. 8A.

In FIGS. 8A and 8B, 1 illustrate a measuring tube, a non-magnetic pipe 2 (such as, for example, a pipe made out of stainless steel with an insulating resin lining 3 on the inside thereof), 4 is a signal electrode, and 5 is a guard electrode for shielding the signal electrode 4. Two sets of signal electrodes 4 and guard electrodes 5 are provided facing each other in the resin lining 3.

An excitation coil 6 for producing a magnetic field in a direction that is perpendicular to the direction of flow of the fluid that is flowing within the measuring tube 1 is provided coiled around a core 7. The signal electrodes 4 and the guard electrodes 5 are provided in a direction that is perpendicular to the magnetic field that is produced by the excitation coil 6. Note that a capacitive electromagnetic flowmeter of this type of structure is proposed in the U.S. Pat. No. 4,631,969. The electromotive force that is picked up by the signal electrode 4 is provided to the signal pickup circuit 200 illustrated in FIG. 1.

Figure 9:
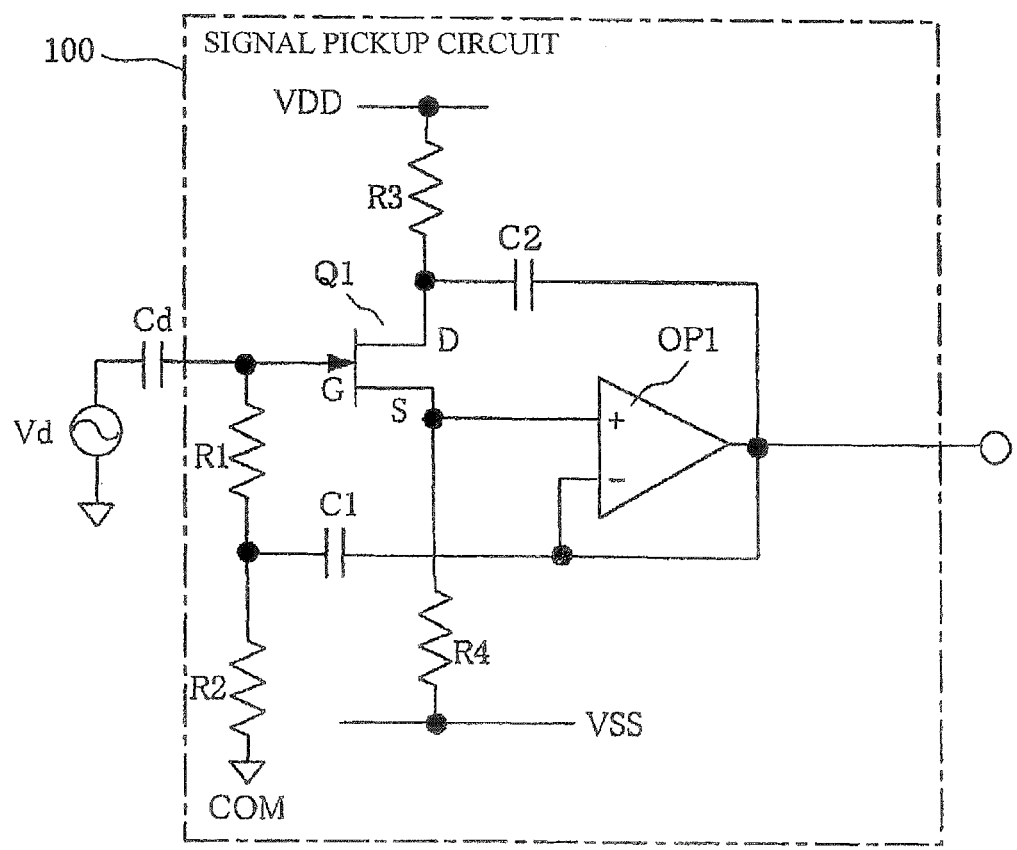
FIG. 9 is a circuit diagram illustrating a signal pickup circuit for a conventional capacitive electromagnetic flowmeter.

The signal pickup circuit 200 differs from the conventional signal pickup circuit 100, illustrated in FIG. 9, in the point that a constant current circuit CT1 is provided instead of the feedback capacitor C2. The constant current circuit CT1 achieves the same role as the feedback capacitor C2 (FIG. 9), and functions as voltage maintaining means for causing the voltages of the drain D and the gate G of the field effect transistor Q1 to be identical, in terms of alternating current. Note that the other structures of the signal pickup circuit 200 are identical to those in the signal pickup circuit 100 (FIG. 9), so explanations thereof are omitted.

The constant current circuit CT1 is structured from a field effect transistor Q2 and a resistor R5. In the constant current circuit CT1, one end of the resistor R5 is connected to the output terminal of an operational amplifier OP1, and the other end of the resistor R5 is connected to the drain D of the field effect transistor Q1 and to the source S of the field effect transistor Q2. Additionally, the gate G of the field effect transistor Q2 is connected to one end of the resistor R5, and the drain D is connected to the power supply VDD.

In the signal pickup circuit 200, an alternating current electromotive force Vd that is produced in the fluid that is measured and that is picked up by the signal electrode 4 is applied through an electrostatic capacitance Cd to the gate G of the field effect transistor Q1. In this case, the field effect transistor Q1 functions as a source follower, so a signal appears at the source S of the field effect transistor Q1 that is of the same voltage as the signal that is applied to the gate G. This signal is applied to the non-inverting input terminal (+) of the operational amplifier OP1.

The operational amplifier OP1 functions as a buffer with an amplification of essentially 1, to output a signal with the same voltage as the signal that is applied to the non-inverting input terminal (+). Additionally, the output signal of the operational amplifier OP1 is connected to the inverting input terminal (−), so the non-inverting input terminal (+) and the inverting input terminal (−) of the operational amplifier OP1 will be at identical voltages, so that the output terminal of the operational amplifier OP1 and the gate G of the field effect transistor Q1 will also be at identical voltages.

On the other hand, the resistor R5 in the constant current circuit CT1 is connected between the output of the operational amplifier OP1 and the drain D of the field effect transistor Q1, so the output signal from the operational amplifier OP1 is fed back to the drain D of the field effect transistor Q1 through the resistor R5.

At this time, a constant voltage is produced at between the ends of the resistor R5 by the constant current that flows in the resistor R5. The constant voltage that is produced between the two ends of the resistor R5 is superimposed on the output signal from the operational amplifier OP1 that is fed back to the drain D of the field effect transistor Q1. The same voltage is maintained, in terms of an alternating current, between the output terminal of the operational amplifier OP1 in the drain D of the field effect transistor Q1 thereby.

As a result, the voltages at the gate G and the drain D of the field effect transistor Q1 will be identical, in terms of an alternating current, and thus no current caused by the floating capacitance therebetween will be produced. Consequently, it is possible to increase the input impedance of the field effect transistor Q1 in the same manner as in the case wherein the feedback capacitor C2 was used.

As can be understood from the circuit operation of this type, in the signal pickup circuit 200 of the present example, a constant voltage that is superimposed onto the output signal from the operational amplifier OP1 is produced by the constant current that flows in the resistor R5, and thus there is no problem with the accumulation of electric charge with a large capacitance in the feedback capacitor C2 as there is in the conventional signal pickup circuit 100. Furthermore, the constant current circuit CT1 that is structured from the field effect transistor Q2 and the resistor R5, when compared with the physically-large large capacity feedback capacitor C2, needs only a circuit of a small surface area, and there is no need for containment in an explosion-proof container.

As described above, given the present embodiment, the low current circuit CT1, as the voltage maintaining means, superimposes a predetermined constant voltage onto the output signal from the operational amplifier OP1 to feedback to the drain of the field effect transistor Q1, to maintain the voltages of the gate and the drain of the field effect transistor Q1 at the same voltage, in terms of alternating current. This makes it possible to increase the input impedance of the field effect transistor Q1 without producing a current, through a floating capacitance, between the gate and the drain of the field effect transistor Q1. In the present example, the constant voltage that is superimposed on the output signal from the operational amplifier OP1 is produced by a flow of electric current.

That is, while in the conventional feedback capacitor a constant voltage is produced by the electric charge that is accumulated in the feedback capacitor, in the present embodiment, this is produced through the flow of an electric current, rather than by an accumulated charge.

The constant current circuit CT1, as the voltage maintaining means, is provided with a third resistor that is connected, on the one end thereof, to the output terminal of an operational amplifier and is connected, on the other end thereof, to the drain of the first field effect transistor, and provided with a field effect transistor Q2 wherein the gate is connected to one end of the resistor R5, the source is connected to the other end of the resistor R5, and the drain is connected to the high-voltage point. In the constant current circuit CT1, a constant voltage is produced in the resistor R5 by the constant current that flows in the resistor R5, where the constant voltage that is generated in the resistor R5 is superimposed onto the output signal from the operational amplifier OP1 that is fed back to the drain of the field effect transistor Q1.

Figure 2:
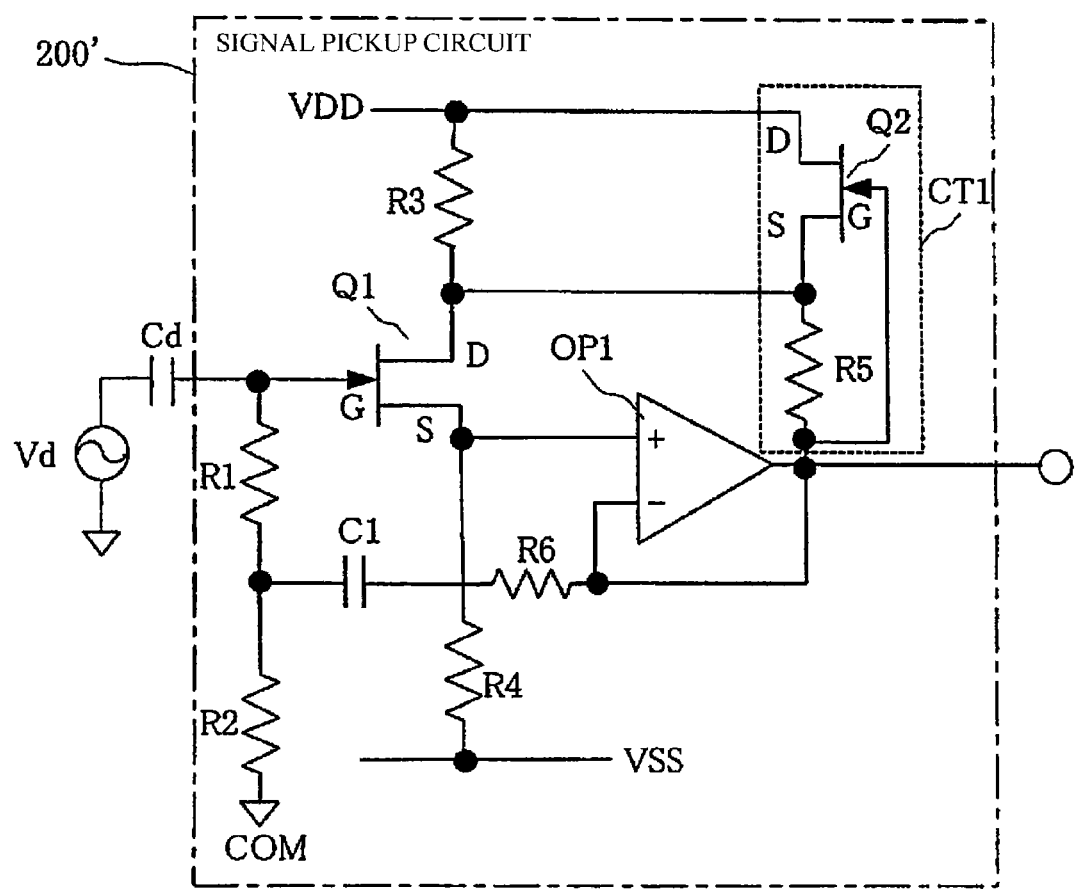
FIG. 2 is a circuit diagram of a signal pickup circuit for a capacitive electromagnetic flowmeter according to another embodiment according to the present invention.

A signal pickup circuit according to the present invention will be explained using FIG. 2. In the signal pickup circuit 200' according to the embodiment, a resistor R6 is connected in series with a capacitor C1 between the inverting input terminal (−) of the operational amplifier OP1 and the contact point between the resistor R1 and the resistor R2.

In the signal pickup circuit 200', the resistor R6 functions as a resistor for preventing oscillation. That is, in the relationship between the frequency and the ratio between the input signal and the output signal (the I/O frequency characteristics), the peak value of the resonance point is reduced, so as to have the effect of preventing the oscillation that occurs when a signal with the frequency at the point of resonance is inputted. Note that while in the present example, the resistor R6 is connected to the inverting input terminal (−) side of the operational amplifier OP1, it may instead be connected to the point of connection between the resistor R1 and the resistor R2.

Figure 3:
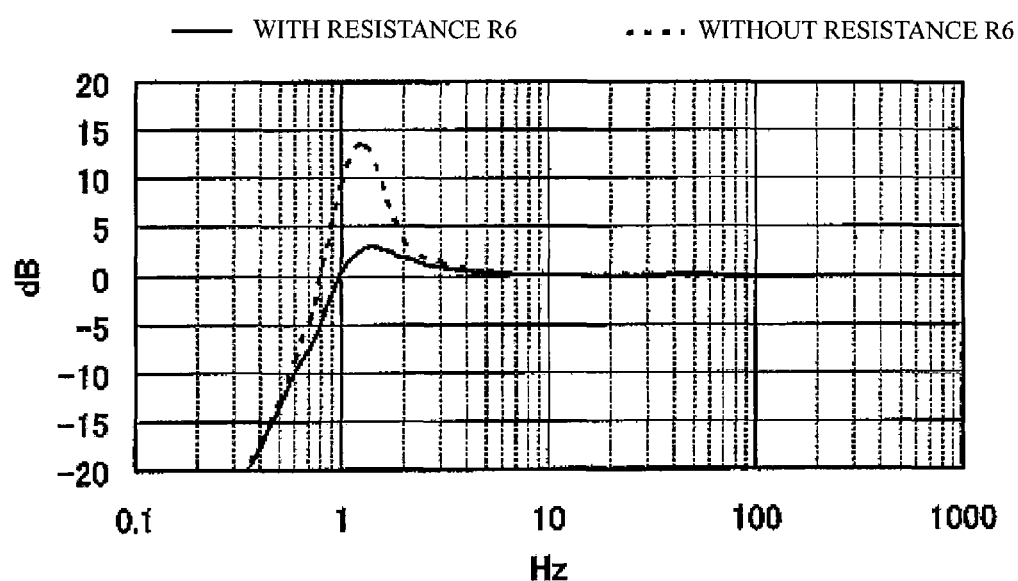
FIG. 3 is a characteristic chart illustrating the result of actually measuring the relationship between the signal voltage I/O ratio and the frequency in the circuit of FIG. 2.

FIG. 3 illustrates the effect of an actual measurement of the relationship between the I/O ratio of the signal voltage and the frequency depending on whether or not the resistor R6 is present. In the measurement results, inserting the resistor R6 improved the peak by approximately ⅕ dB when compared to the case wherein there is no resistor R6. It can be seen from this as well that the peak value at the resonance point is reduced through the use of the oscillation preventing resistor R6.

Note that while, in the embodiments described above, a constant current circuit CT1 structured from the field effect transistor Q2 and the resistor R5 was used as the voltage maintaining means, a variety of other variations may be considered for the constant current circuit that can be used for the voltage maintaining means.

Figure 4:
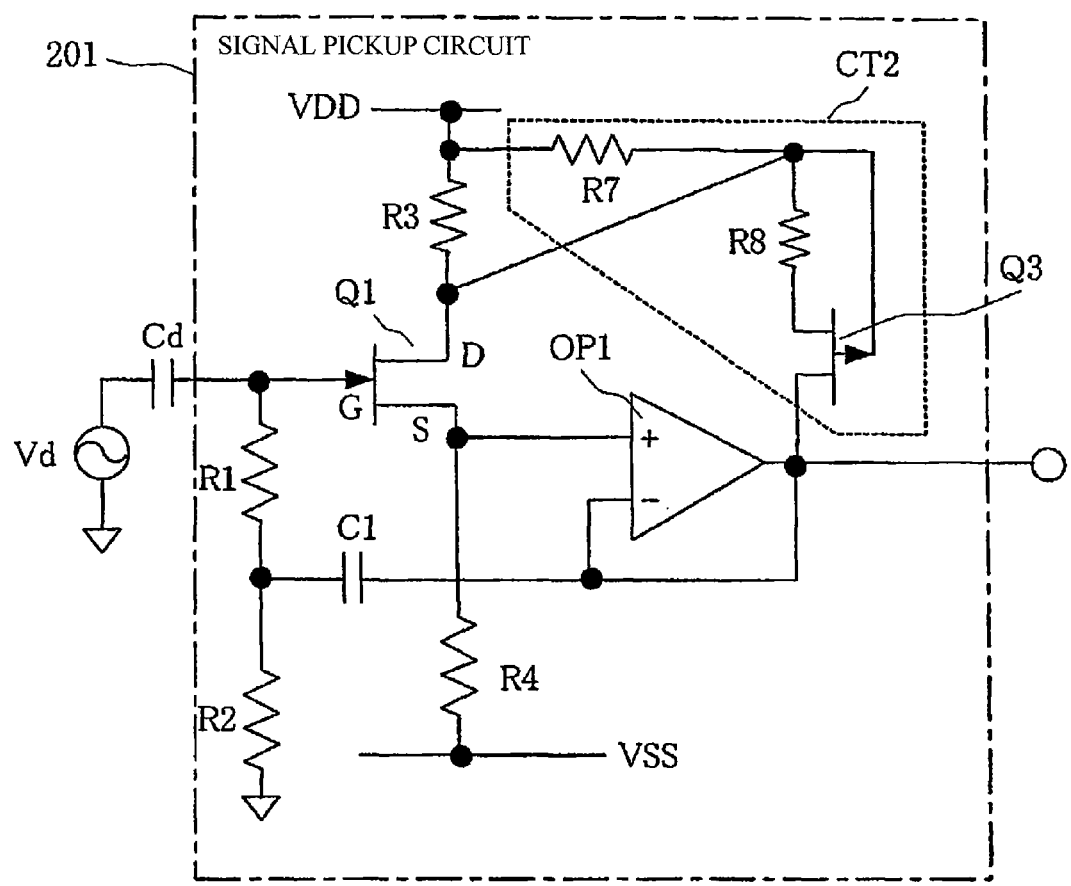
FIG. 4 is a circuit diagram illustrating a constant current circuit used as voltage maintaining means.
Figure 5:
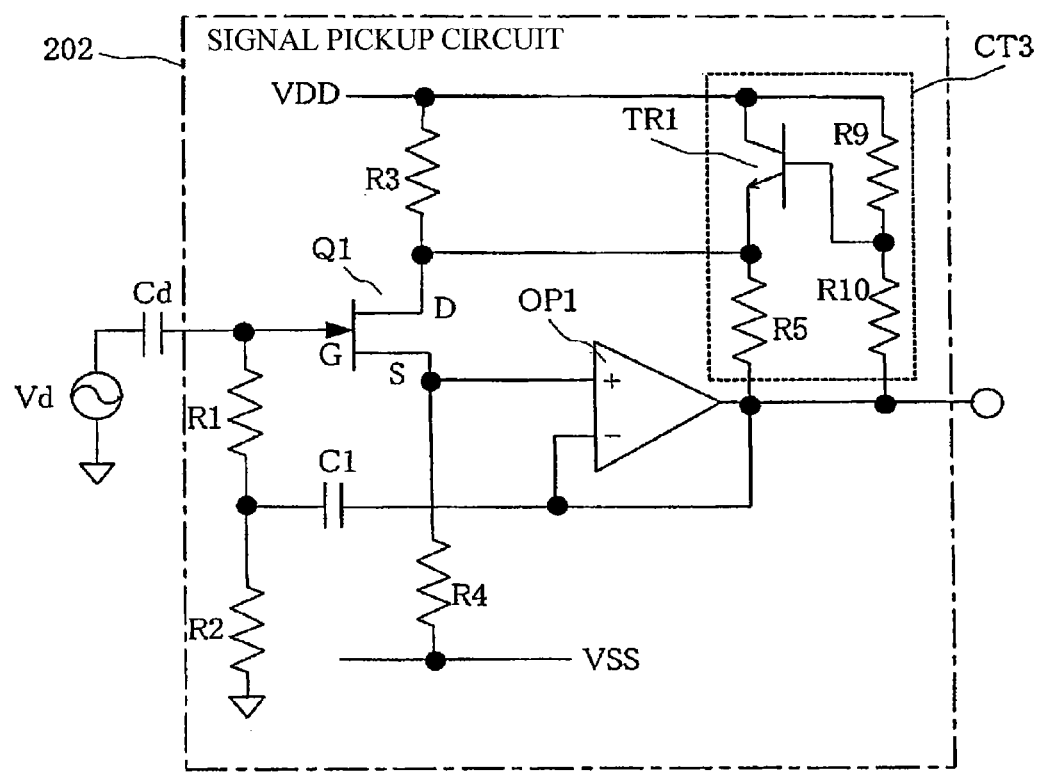
FIG. 5 is a circuit diagram illustrating another example of a constant current circuit used as voltage maintaining means.
Figure 6:
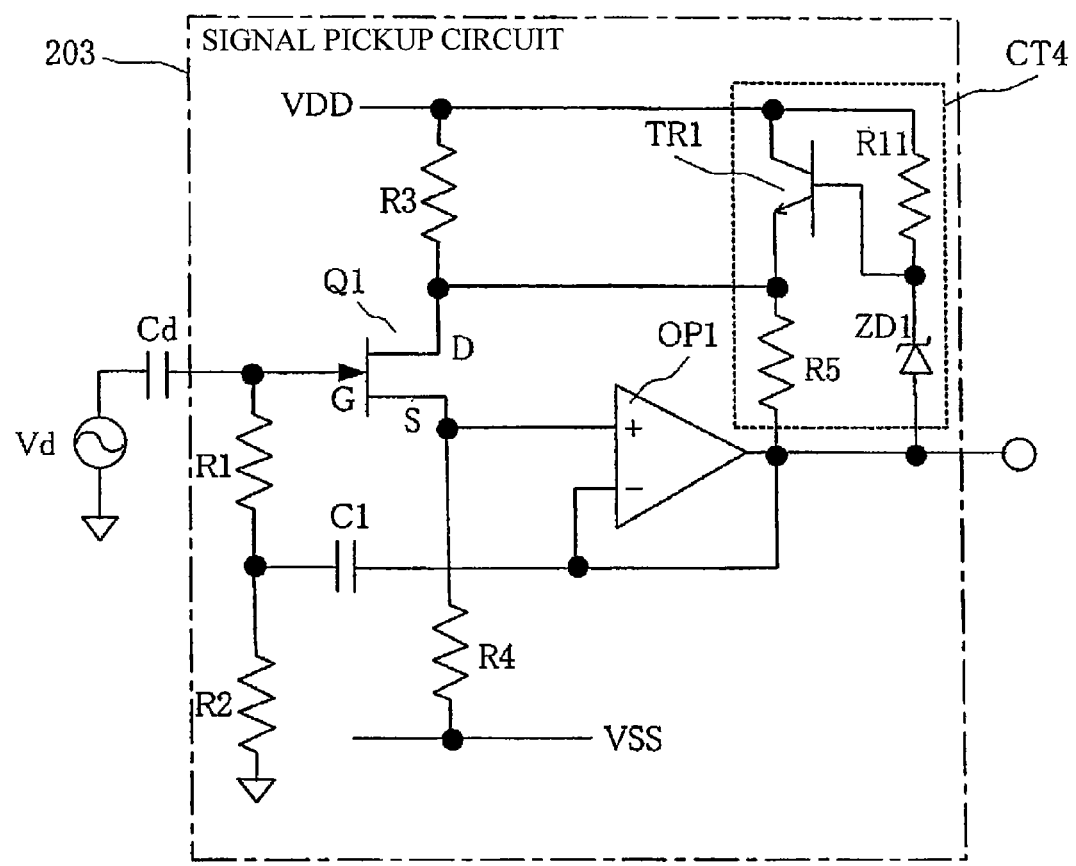
FIG. 6 is a circuit diagram illustrating a further example of a constant current circuit used as voltage maintaining means.

For example, as illustrated in FIG. 4, a constant current circuit CT2 may be structured from a field effect transistor Q3 and from resistors R7 and R8. Furthermore, as is illustrated in FIG. 5, a constant current circuit CT3 may be structured from a transistor TR1 and resistors R5, R9, and R10. Furthermore, as is illustrated in FIG. 6, a constant current circuit CT4 may be structured from a transistor TR1, resistors R5 and R11, and a Zener diode ZD1.

Figure 7:
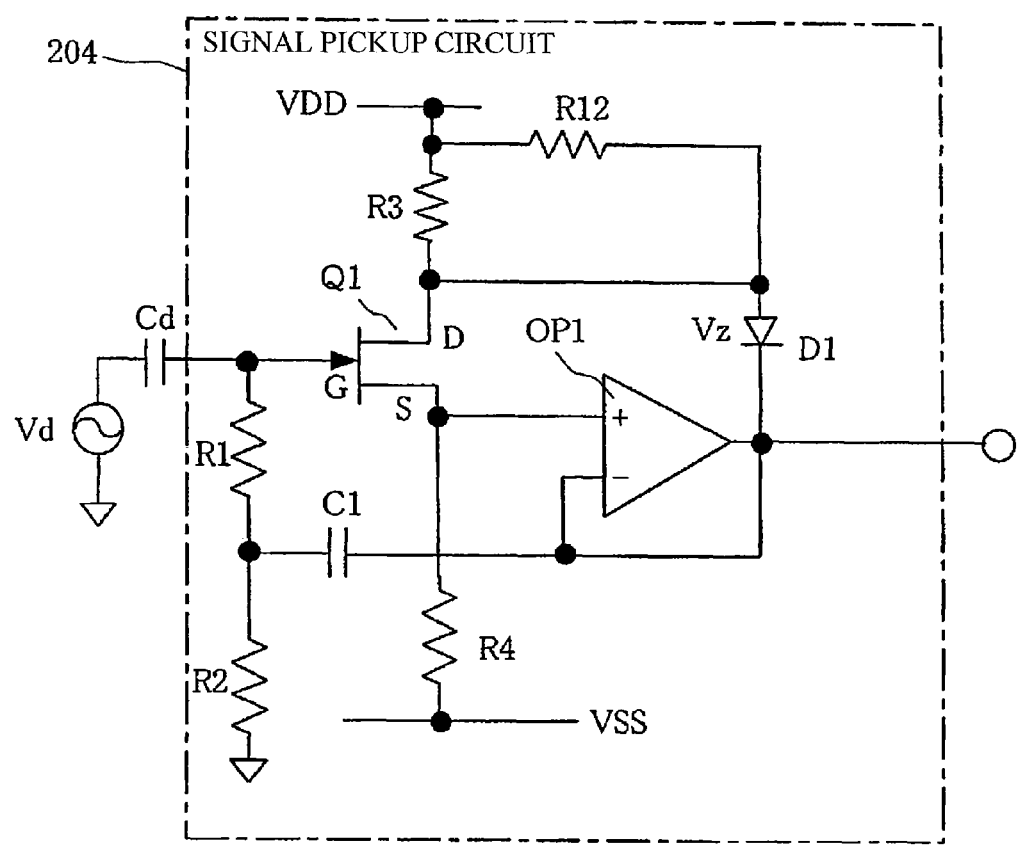
FIG. 7 is a circuit diagram illustrating a fourth example of voltage maintaining means.

Additionally, a constant current circuit need not necessarily be used for the voltage maintaining means. For example, as illustrated in FIG. 7, a forward voltage that is produced by a diode D1 through a current that flows through a resistor R12 may be superimposed on the output voltage from the operational amplifier OP1 to be fed back to the drain D of the field effect transistor Q1. The diode D1 will produce a constant forward voltage Vd even if the electric current that flows is not a constant current.

What is claimed is:

1. A capacitive electromagnetic flowmeter comprising:
an excitation coil producing a magnetic field in a direction perpendicular to the direction of flow of a fluid that flows within a measuring tube;
a signal electrode, provided within the measuring tube, picking up an electromotive force produced in the fluid that flows within the measuring tube due to the magnetic filed produced by the excitation coil, through electrostatic capacitive coupling with the fluid that flows within the measuring tube;
a first field effect transistor having a gate input of the electromotive force picked up by the signal electrode;
an operational amplifier wherein the output of the source of the first field effect transistor is applied to the non-inverting input terminal thereof;
a first and a second feedback path to feedback, to the inverting input terminal of the operational amplifier and to the drain of the first field effect transistor, the output signal from the output terminal of the operational amplifier;
a voltage maintaining circuit maintaining the voltages of the gate and the drain of the first field effect transistor at the same voltage, in terms of alternating current through superimposing a predetermined constant voltage, generated by a flow of an electric current, onto the output signal of the operational amplifier fed back to the drain of the first field effect transistor;
a series connection circuit of a first and a second resistor, connected between the gate of the first field effect transistor and a common voltage point; and
a capacitor connected between the contact point of the first and second resistors and the inverting input terminal of the operational amplifier,
wherein the voltage maintaining circuit is a constant current circuit picking up a constant voltage in accordance with a constant current from an output signal from the operational amplifier and supplying the constant voltage to the drain of the first field effect transistor, and
wherein the constant current circuit comprises:
a third resistor wherein one end is connected to the output terminal of the operational amplifier and the other end is connected to the drain of the first field effect transistor; and
a second field effect transistor wherein the gate is connected to one end of the third resistor, the source is connected to the other end of the third resistor, and the drain is connected to the high-voltage point.

2. The capacitive electromagnetic flowmeter as set forth in claim 1, further comprising:
a resistor preventing an oscillation, connected in series with a capacitor connected between inverting input terminal of the operational amplifier and the point of contact between the first resistor and the second resistor.

* * * * *